US012683648B2

(12) United States Patent
Tertinek et al.

(10) Patent No.: US 12,683,648 B2
(45) Date of Patent: Jul. 14, 2026

(54) COMMUNICATION SYSTEM, COMMUNICATION DEVICE, METHODS OF OPERATION AND COMPUTER PROGRAMS

(71) Applicant: NXP B.V., Eindhoven (NL)

(72) Inventors: Stefan Tertinek, Graz (AT); Wolfgang Küchler, Graz (AT); Manuel Lafer, Ottendorf (AT)

(73) Assignee: NXP B.V., Eindhoven (NL)

( * ) Notice: Subject to any disclaimer, the term of this patent is extended or adjusted under 35 U.S.C. 154(b) by 545 days.

(21) Appl. No.: 18/166,217

(22) Filed: Feb. 8, 2023

(65) Prior Publication Data

US 2023/0268954 A1     Aug. 24, 2023

(30) Foreign Application Priority Data

Feb. 22, 2022    (EP) .................................... 22158099

(51) Int. Cl.
*H04W 64/00*         (2009.01)
*H04B 1/69*          (2011.01)

(52) U.S. Cl.
CPC .............. *H04B 1/69* (2013.01); *H04W 64/00* (2013.01)

(58) Field of Classification Search
CPC . H04W 12/08; H04W 12/104; H04W 12/122; H04W 12/61; H04W 12/63;
(Continued)

(56) References Cited

U.S. PATENT DOCUMENTS

| | | | | |
|---|---|---|---|---|
| 7,006,553 B1 * | 2/2006 | McCorkle | .............. | H04B 1/719 |
| | | | | 370/324 |
| 8,483,720 B2 * | 7/2013 | Farahani | ............... | G01S 13/767 |
| | | | | 342/450 |

(Continued)

OTHER PUBLICATIONS

Smaoui, N., "Single-Antenna AoA Estimation with UWB Radios", 2021 IEEE Wireless Communications and Networking Conference (WCNC), Mar. 29, 2021.

(Continued)

*Primary Examiner* — Joseph Arevalo

(57)         ABSTRACT

In accordance with an aspect of the present disclosure, a communication system is provided, comprising: a first ultra-wideband (UWB) transmitter configured to be coupled to a first antenna; a second UWB transmitter configured to be coupled to a second antenna; a controller configured to cause the first UWB transmitter to transmit a first packet to an external communication device, wherein the first packet contains a predefined code; wherein the controller is further configured to cause the second UWB transmitter to transmit a second packet to the external communication device, wherein the second packet contains a cyclically shifted version of said predefined code. In accordance with another aspect of the present disclosure, a communication device is provided, comprising: an ultra-wideband (UWB) receiver configured to be coupled to an antenna, wherein the UWB receiver is further configured to receive at least a first packet and a second packet from an external communication system, wherein the first packet contains a predefined code and the second packet contains a cyclically shifted version of said predefined code; a processing unit configured to correlate the first packet and the second packet received by the UWB receiver with the predefined code. In accordance with further aspects, corresponding methods of operation are
(Continued)

conceived, as well as computer programs for carrying out said methods.

19 Claims, 8 Drawing Sheets

(58) Field of Classification Search
CPC .............. H04W 24/10; H04W 64/003; H04W 72/0446; H04W 84/10
USPC ............. 455/456.1, 205, 39, 216, 41.2, 313, 455/414.1, 566, 424, 266, 411, 73, 418
See application file for complete search history.

(56) References Cited

U.S. PATENT DOCUMENTS

| | | | |
|---|---|---|---|
| 10,992,419 B1 | 4/2021 | Zhou et al. | |
| RE48,832 E * | 11/2021 | Marrow ................ | G01S 1/0428 |
| 11,408,990 B2 | 8/2022 | Casamassina et al. | |
| 2003/0058971 A1 * | 3/2003 | Langford .................. | G01S 3/50 |
| | | | 375/343 |
| 2005/0053121 A1 * | 3/2005 | Lakkis ................... | H04L 5/0005 |
| | | | 375/130 |
| 2006/0104337 A1 * | 5/2006 | Johnson ............... | H04B 1/7183 |
| | | | 375/149 |
| 2007/0014369 A1 * | 1/2007 | Santhoff .............. | H04B 1/7163 |
| | | | 375/240.19 |
| 2007/0019710 A1 | 1/2007 | Lakkis | |
| 2008/0220732 A1 * | 9/2008 | Ikramov .............. | A61B 5/0507 |
| | | | 455/114.3 |
| 2009/0262010 A1 * | 10/2009 | Kwak ................... | G01S 13/282 |
| | | | 342/145 |
| 2015/0325202 A1 * | 11/2015 | Lake ...................... | G06F 3/147 |
| | | | 345/520 |

| | | | |
|---|---|---|---|
| 2018/0167150 A1 * | 6/2018 | Clancy .................... | H04L 43/16 |
| 2018/0254870 A1 | 9/2018 | Dutz et al. | |
| 2020/0252101 A1 | 8/2020 | McLaughlin et al. | |
| 2021/0043999 A1 * | 2/2021 | Da Costa Bras Lima .................. | |
| | | | H01Q 1/48 |
| 2021/0046961 A1 * | 2/2021 | Whittemore ........... | B61L 23/06 |
| 2021/0066799 A1 * | 3/2021 | Avser ....................... | H01Q 5/25 |
| 2021/0070332 A1 * | 3/2021 | Hanczor ................ | H04W 4/42 |
| 2021/0075090 A1 * | 3/2021 | Yarga .................... | H01Q 1/241 |
| 2022/0094053 A1 * | 3/2022 | Jiang ....................... | H01Q 5/42 |
| 2022/0140971 A1 * | 5/2022 | Hammerschmidt ......................... | |
| | | | H04W 72/0453 |
| | | | 370/329 |
| 2022/0166649 A1 | 5/2022 | Lafer et al. | |
| 2022/0210607 A1 * | 6/2022 | Bollard .............. | H04B 1/71632 |
| 2022/0304084 A1 * | 9/2022 | Ahmed ................... | G01S 11/02 |
| 2023/0021454 A1 * | 1/2023 | Aldana ................. | H04B 1/719 |
| 2023/0084310 A1 * | 3/2023 | Cooper ................... | H01Q 1/38 |
| | | | 343/702 |
| 2023/0152440 A1 * | 5/2023 | Choi ...................... | H01Q 21/30 |
| | | | 342/125 |
| 2024/0045019 A1 * | 2/2024 | Shin ........................... | G01S 5/14 |
| 2024/0292167 A1 * | 8/2024 | Nesfield ................. | H04R 27/00 |
| 2024/0333996 A1 * | 10/2024 | Wang ............... | H04N 21/43078 |

OTHER PUBLICATIONS

U.S. Appl. No. 17/819,487, filed Aug. 12, 2022, entitled "A Radar System, a Radar Arrangement, and a Radar Method for Concurrent Radar Operations".

U.S. Appl. No. 17/817,372, filed Aug. 4, 2022, entitled "Communication Device and Corresponding Operating Method".

EP Application No. 22155222.7 filed on Feb. 4, 2022, entitled "Communication Device and Operating Method".

* cited by examiner

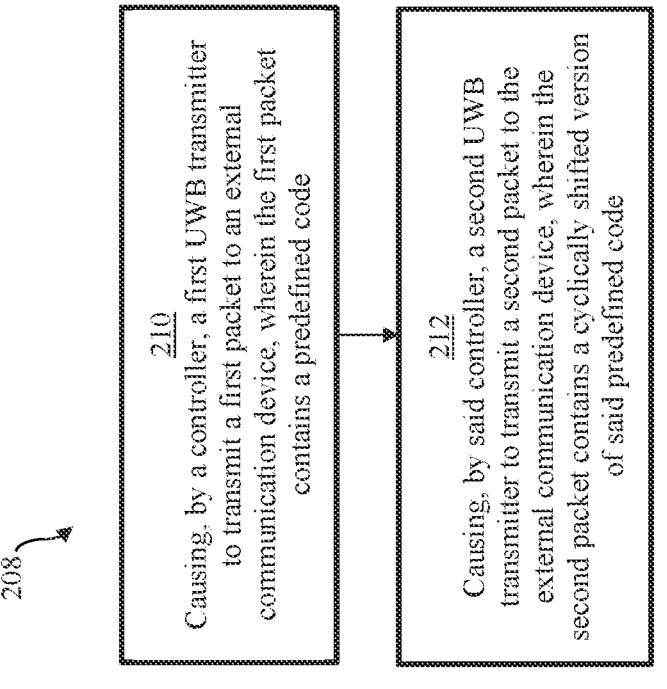

208

210
Causing, by a controller, a first UWB transmitter to transmit a first packet to an external communication device, wherein the first packet contains a predefined code 212
Causing, by said controller, a second UWB transmitter to transmit a second packet to the external communication device, wherein the second packet contains a cyclically shifted version of said predefined code

Fig. 2B

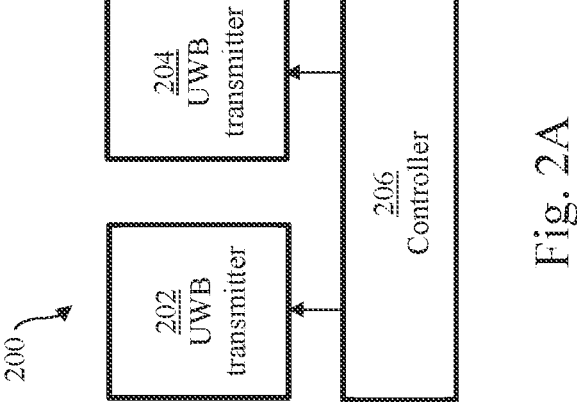

200

202
UWB transmitter

204
UWB transmitter

206
Controller

Fig. 2A

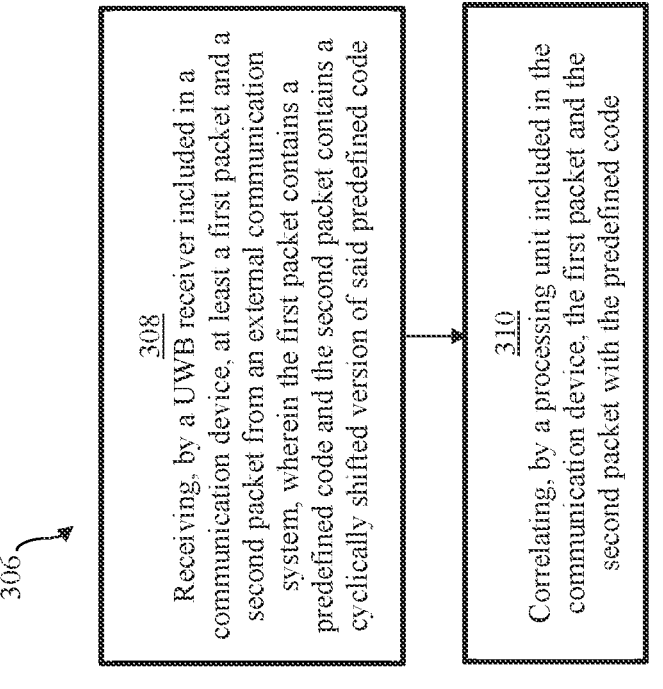

308

Receiving, by a UWB receiver included in a communication device, at least a first packet and a second packet from an external communication system, wherein the first packet contains a predefined code and the second packet contains a cyclically shifted version of said predefined code

310

Correlating, by a processing unit included in the communication device, the first packet and the second packet with the predefined code

302
UWB receiver

304
Processing unit

COMMUNICATION SYSTEM, COMMUNICATION DEVICE, METHODS OF OPERATION AND COMPUTER PROGRAMS

CROSS-REFERENCE TO RELATED APPLICATIONS

This application claims the priority under 35 U.S.C. § 119 of European Patent application no. 22158099.6, filed on 22 Feb. 2022, the contents of which are incorporated by reference herein.

TECHNICAL FIELD

The present disclosure relates to a communication system. Furthermore, the present disclosure relates to a corresponding method of operating a communication system, and to a computer program for carrying out said method. In addition, the present disclosure relates to a communication device, to a corresponding method of operating a communication device, and to a computer program for carrying out said method.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

SUMMARY

In accordance with a first aspect of the present disclosure, a communication system is provided, comprising: a first ultra-wideband (UWB) transmitter configured to be coupled to a first antenna; a second UWB transmitter configured to be coupled to a second antenna; a controller configured to cause the first UWB transmitter to transmit a first packet to an external communication device, wherein the first packet contains a predefined code; wherein the controller is further configured to cause the second UWB transmitter to transmit a second packet to the external communication device, wherein the second packet contains a cyclically shifted version of said predefined code.

In one or more embodiments, the controller is further configured to cause the first UWB transmitter and the second UWB transmitter to transmit the first packet, respectively the second packet, simultaneously or substantially simultaneously to the external communication device.

In one or more embodiments, the predefined code is a code having ideal circular autocorrelation properties, in particular a ternary code.

In one or more embodiments, the controller is further configured to synchronize the first UWB transmitter and the second UWB transmitter before the first UWB transmitter transmits the first packet and the second UWB transmitter transmits the second packet.

In one or more embodiments, the communication system further comprises at least one third UWB transmitter configured to be coupled to a third antenna, wherein the controller is further configured to cause the third UWB transmitter to transmit a third packet to the external communication device, wherein the third packet contains another cyclically shifted version of the predefined code.

In one or more embodiments, the communication system forms part of an initiator in a localization system.

In accordance with a second aspect of the present disclosure, a method of operating a communication system is conceived, comprising: causing, by a controller, a first ultra-wideband (UWB) transmitter to transmit a first packet to an external communication device, wherein the first packet contains a predefined code; causing, by said controller, a second UWB transmitter to transmit a second packet to the external communication device, wherein the second packet contains a cyclically shifted version of said predefined code.

In accordance with a third aspect of the present disclosure, a computer program is provided, comprising executable instructions which, when executed by a controller of a communication system, cause said controller to carry out a method of the kind set forth.

In accordance with a fourth aspect of the present disclosure, a communication device is provided, comprising: an ultra-wideband (UWB) receiver configured to be coupled to an antenna, wherein the UWB receiver is further configured to receive at least a first packet and a second packet from an external communication system, wherein the first packet contains a predefined code and the second packet contains a cyclically shifted version of said predefined code; a processing unit configured to correlate the first packet and the second packet received by the UWB receiver with the predefined code.

In one or more embodiments, the UWB receiver is configured to receive the first packet and the second packet simultaneously or substantially simultaneously.

In one or more embodiments, the processing unit is further configured to generate a channel impulse response (CIR) based on a result of correlating the first packet and the second packet with the predefined code.

In one or more embodiments, the processing unit is further configured to compute phase values associated with peaks included in the CIR, and to compute an angle of departure of the first packet and the second packet based on said phase values.

In one or more embodiments, the communication system is a responder in a localization system.

In accordance with a fifth aspect of the present disclosure, a method of operating a communication device is conceived, comprising: receiving, by an ultra-wideband (UWB) receiver included in the communication device, at least a first packet and a second packet from an external communication system, wherein the first packet contains a predefined code and the second packet contains a cyclically shifted version of said predefined code; correlating, by a processing unit included in the communication device, the first packet and the second packet with the predefined code.

In accordance with a sixth aspect of the present disclosure, a computer program is provided, comprising executable instructions which, when executed by a processing unit of a communication device, cause said processing unit to carry out a method of the kind set forth.

DESCRIPTION OF DRAWINGS

Embodiments will be described in more detail with reference to the appended drawings.

FIG. 2A shows an illustrative embodiment of a communication system.

FIG. 2B shows an illustrative embodiment of a method of operating a communication system.

FIG. 3A shows an illustrative embodiment of a communication device.

FIG. 3B shows an illustrative embodiment of a method of operating a communication device.

DESCRIPTION OF EMBODIMENTS

Figure 1A:
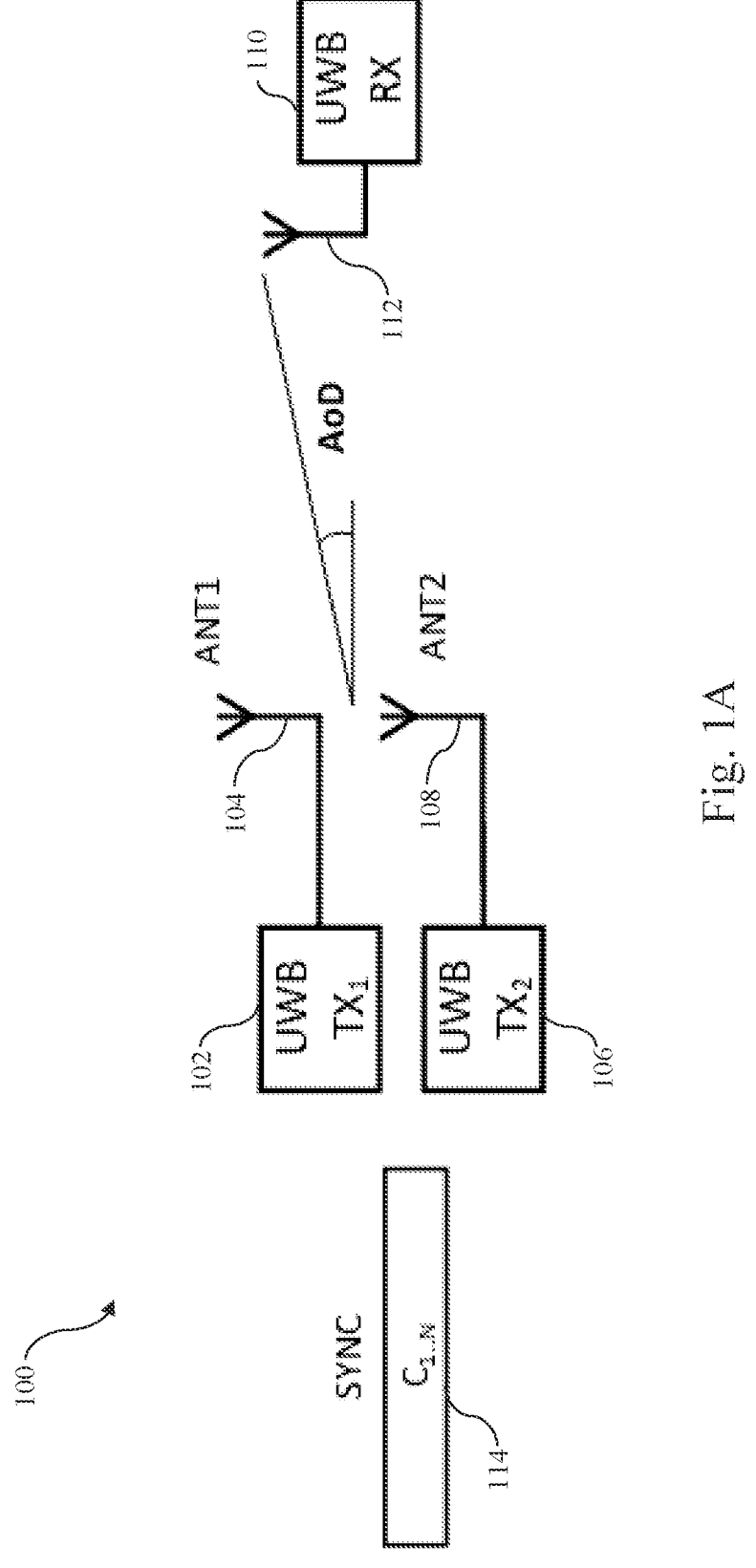
FIG. 1A shows an example of a localization system.

As mentioned above, UWB communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

In particular, UWB technology—also referred to as impulse-radio ultra-wideband (IR-UWB)—is an RF communication technology that uses pulses having a short duration for data communication. An important feature of IR-UWB technology is that it can be used for secure and accurate distance measurements between two or more devices. Typical distance measurement methods are the so-called single-sided two-way ranging (SS-TWR) method and the double-sided two-way ranging (DS-TWR) method.

Because UWB technology has an accurate distance measurement capability, it may be used to advantage in access systems in which the position of devices should be determined to enable access to an object. For instance, a vehicle access system may comprise a user's smart device (e.g., key fob) and another smart device (e.g., an anchor embedded in the vehicle). To enable access to the vehicle, the user's smart device must have a predefined range relative to the other smart device. Therefore, UWB transceivers are typically configured to operate in a ranging mode. In another example, UWB technology may be used for accessing a building or a predefined space within a building.

In the ranging mode of operation, so-called UWB frames (i.e., UWB signals) will typically be exchanged between two devices via at least one antenna on each device, and at least a SS-TWR operation will be carried out (which may also be referred to as a ping-pong operation). In particular, channel impulse responses (CIRs) are estimated on both devices, timestamps will be generated based on the CIRs on both devices, and those timestamps are exchanged. Then, a time of flight (ToF) is calculated based on the timestamps and a range (i.e., a distance) is calculated based on the ToF. Alternatively, a DS-TWR operation may be carried out (which may also be referred to as a ping-pong-ping operation). The angle-of-arrival (AoA) mode of operation is similar to the ranging mode, but it involves at least two antennas on one device. In particular, in the AoA mode of operation, two phase values associated with at least two CIRs are calculated on one device. Then, a phase difference of arrival (PDoA) is calculated based on the two-phase values, and an AoA is calculated based on the PDoA. The AoA mode of operation may facilitate a more accurate determination of the position of an object and may thus complement ranging operations performed in the ranging mode. As used in this description, the ranging mode of operation may therefore be extended to include the AoA mode of operation, in the sense that when a device operates in the ranging mode, it may optionally perform additional operations which are typically performed in the AoA mode of operation.

Accordingly, a benefit of using an IR-UWB system is that a channel impulse response, as determined by a responder using a received UWB frame, can be used to determine not only the distance (i.e., the range) to an initiator but also the angle of arrival of the incoming radio-frequency (RF) wave from the initiator, which allows the system to use both range and angle for precise localization. It is noted that the format of UWB frames is defined in the technical standard 802.15.4z-2020 (*IEEE Standard for Low-Rate Wireless Networks, Amendment* 1: *Enhanced Ultra Wideband* (*UWB*) *Physical Layers* (*PHYs*) *and Associated Ranging Techniques*).

Instead, or in addition to the angle of arrival, the so-called angle of departure (AoD) may be determined. Thus, another benefit of using an IR-UWB system is that the CIR, as derived by a responder from a received frame, can be used to determine not only the distance (i.e., range) to an initiator but also the angle of departure (AoD) of the incoming radio-frequency (RF) wave from the initiator, which allows a localization system to use both range and angle for a precise localization of the responder. It is noted that the AoD is equivalent to the more commonly used AoA, the difference being that at least two antennas are used on the transmitter side for the AoD determination, while two antennas are used on the receiver side for the AoA determination.

FIG. 1A shows an example of a localization system 100. The localization system 100 comprises a communication system that includes two UWB transmitters 102, 106, each one of which is configured to be coupled to a transmitter antenna 104, 108. In addition, the localization system 100 comprises a communication device that includes a UWB receiver 110, which is configured to be coupled to a receiver antenna 112. Each UWB transmitter 102, 106 is configured to transmit a SYNC packet 114, which may be implemented as a UWB frame comprising a SYNC field as defined in the above-mentioned technical standard 802.15.4z-2020. As used herein, the term "UWB frame" may be regarded as synonymous with the term "UWB signal". Furthermore, the SYNC packet 114 comprises a code ($C_{1 \ldots N}$) composed of N bits.

Figure 1B:
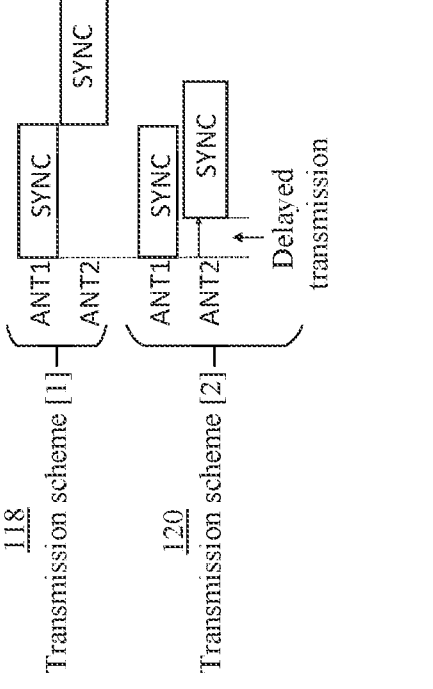
FIG. 1B shows examples of different transmission schemes.

FIG. 1B shows examples of different transmission schemes 116. In particular, the transmission over the transmitter antennas 104, 108 is time-delayed such that the UWB receiver 110 receives the two packets at different times, allowing it to uniquely derive a CIR from the UWB receiver 110 to each of the UWB transmitters 102, 106. For this purpose, two different transmission schemes may be used. In a first transmission scheme 118, the SYNC packets are non-overlapping. In one implementation, the first and second SYNC packet may be formed by the preamble and scrambled timestamp sequence (STS) of a UWB frame, as defined in the technical standard 802.15.4z-2020. In that case, the AoD may be computed from the CIR obtained from the preamble and the STS. It is noted that computing the AoD implies that the AoA may also be determined, since they are equivalent to each other. In a second transmission scheme 120, the SYNC packets overlap with a predefined delay (e.g., 128 ns) such that the resulting CIRs can be uniquely identified. Both transmission schemes have the disadvantage of an increased airtime, because the SYNC packets should be separated in time to allow a unique determination of the CIRs. This, in turn, reduces the interference-free airtime for other UWB systems.

Now discussed are a communication system, a communication device, corresponding methods of operation and computer programs for carrying out said methods, which facilitate avoiding an increased airtime in localization systems of the kind set forth, while also avoiding or minimizing negative impacts on the localization accuracy. In particular, the presently disclosed system, device, methods and computer programs facilitate a substantially simultaneous transmission of SYNC packets by different transmitters in a localization system, while avoiding or minimizing a negative impact on the capacity to determine CIRs.

FIG. 2A shows an illustrative embodiment of a communication system 200. The communication system 200 comprises a first UWB transmitter 202 configured to be coupled to a first antenna (not shown). Furthermore, the communication system 200 comprises a second UWB transmitter 204 configured to be coupled to a second antenna (not shown). In addition, the communication system 200 comprises a controller 206 configured to cause the first UWB transmitter 202 to transmit a first packet to an external communication device (not shown), wherein the first packet contains a predefined code. Furthermore, the controller 206 is configured to cause the second UWB transmitter 204 to transmit a second packet to the external communication device, wherein the second packet contains a cyclically shifted version of said predefined code. By including the cyclically shifted version of the predefined code in the second packet, the first packet and the second packet may be distinguished more easily by the external communication device. This, in turn, facilitates allowing a simultaneous transmission of the first packet and the second packet, while avoiding or minimizing a negative impact on the external device's capacity to determine CIRs. Thereby, a significantly increased airtime may be avoided in localization systems in which the communication system is used.

In one or more embodiments, the controller is further configured to cause the first UWB transmitter and the second UWB transmitter to transmit the first packet, respectively the second packet, simultaneously or substantially simultaneously to the external communication device. In this way, the airtime may be reduced significantly, while negative impacts on the localization accuracy may be avoided or minimized. It is noted that a substantially simultaneous transmission refers to transmission that is simultaneous within a certain error margin. That is to say, the controller may be configured to control the first and second UWB transmitter such that the transmission of the first and second packet is achieved with a maximum deviation of less than a predefined amount of time. The skilled person will appreciate that this predefined amount of time represents an acceptable error margin, which may depend on the application of the localization system. Furthermore, in one or more embodiments, the predefined code is a code having ideal circular autocorrelation properties. For example, the predefined may be a ternary code. The use of a code with ideal circular autocorrelation properties may ensure that the UWB receiver is able to derive a CIR from overlapping data packets.

In one or more embodiments, the controller is further configured to synchronize the first UWB transmitter and the second UWB transmitter before the first UWB transmitter transmits the first packet and the second UWB transmitter transmits the second packet. In this way, a simultaneous transmission of the data packets is facilitated. In one or more embodiments, the communication system further comprises at least one third UWB transmitter configured to be coupled to a third antenna, wherein the controller is further configured to cause the third UWB transmitter to transmit a third packet to the external communication device, wherein the third packet contains another cyclically shifted version of the predefined code. In this way, the communication system may easily be extended to enable a multi-dimensional AoD or AoA determination. In a practical implementation, the communication system forms part of an initiator in a localization system.

FIG. 2B shows an illustrative embodiment of a method 208 of operating a communication system. The method 208 comprises the following steps. At 210, a controller causes a first UWB transmitter to transmit a first packet to an external communication device, wherein the first packet contains a predefined code. Furthermore, at 212, the controller causes a second UWB transmitter to transmit a second packet to the external communication device, wherein the second packet contains a cyclically shifted version of said predefined code. The skilled person will appreciate that the controller may cause the UWB transmitters to perform these functions in various ways. For example, the controller may accomplish this by sending appropriate control signals, including suitable instructions, to the UWB transmitters. As mentioned above, by including the cyclically shifted version of the predefined code in the second packet, the first packet and the second packet may be distinguished more easily by the external communication device.

FIG. 3A shows an illustrative embodiment of a communication device 300. The communication device 300 comprises a UWB receiver 302 configured to be coupled to an antenna (not shown). Furthermore, the communication device 300 comprises a processing unit 304 configured to correlate at least a first packet and a second packet received by the UWB receiver 302 with a predefined code, wherein the first packet contains the predefined code, and the second packet contains a cyclically shifted version of said predefined code. Since a cyclically shifted version of the predefined code is included in the second packet, instead of the predefined code itself, the first packet and the second packet may be distinguished more easily by the communication device.

In one or more embodiments, the UWB receiver is configured to receive the first packet and the second packet simultaneously or substantially simultaneously. In this way, the airtime may be reduced significantly, while negative impacts on the localization accuracy may be avoided or minimized. It is noted that a substantially simultaneous reception refers to a reception that is simultaneous within a certain error margin. That is to say, the UWB receiver may be configured to receive the first and second packet with a maximum deviation of less than a predefined amount of time. The skilled person will appreciate that this predefined amount of time represents an acceptable error margin, which may depend on the application of the localization system. In one or more embodiments, the processing unit is further configured to generate a CIR based on a result of correlating the first packet and the second packet with the predefined code. In this way, the determination of the AoD is facilitated. For example, in a practical implementation, the processing unit is further configured to compute phase values associated with peaks included in the CIR, and to compute an angle of departure of the first packet and the second packet based on said phase values. Furthermore, in a practical implementation, the communication device is a responder in a localization system.

FIG. 3B shows an illustrative embodiment of a method 306 of operating a communication device. The method 306 comprises the following steps. At 308, a UWB receiver included in the communication device receives at least a first packet and a second packet from an external communication system, wherein the first packet contains a predefined code, and the second packet contains a cyclically shifted version of said predefined code. Furthermore, at 310, a processing unit included in the communication device correlates the first packet and the second packet with the predefined code. As mentioned above, since a cyclically shifted version of the predefined code is included in the second packet, instead of the predefined code itself, the first packet and the second packet may be distinguished more easily by the communication device.

Figure 4:
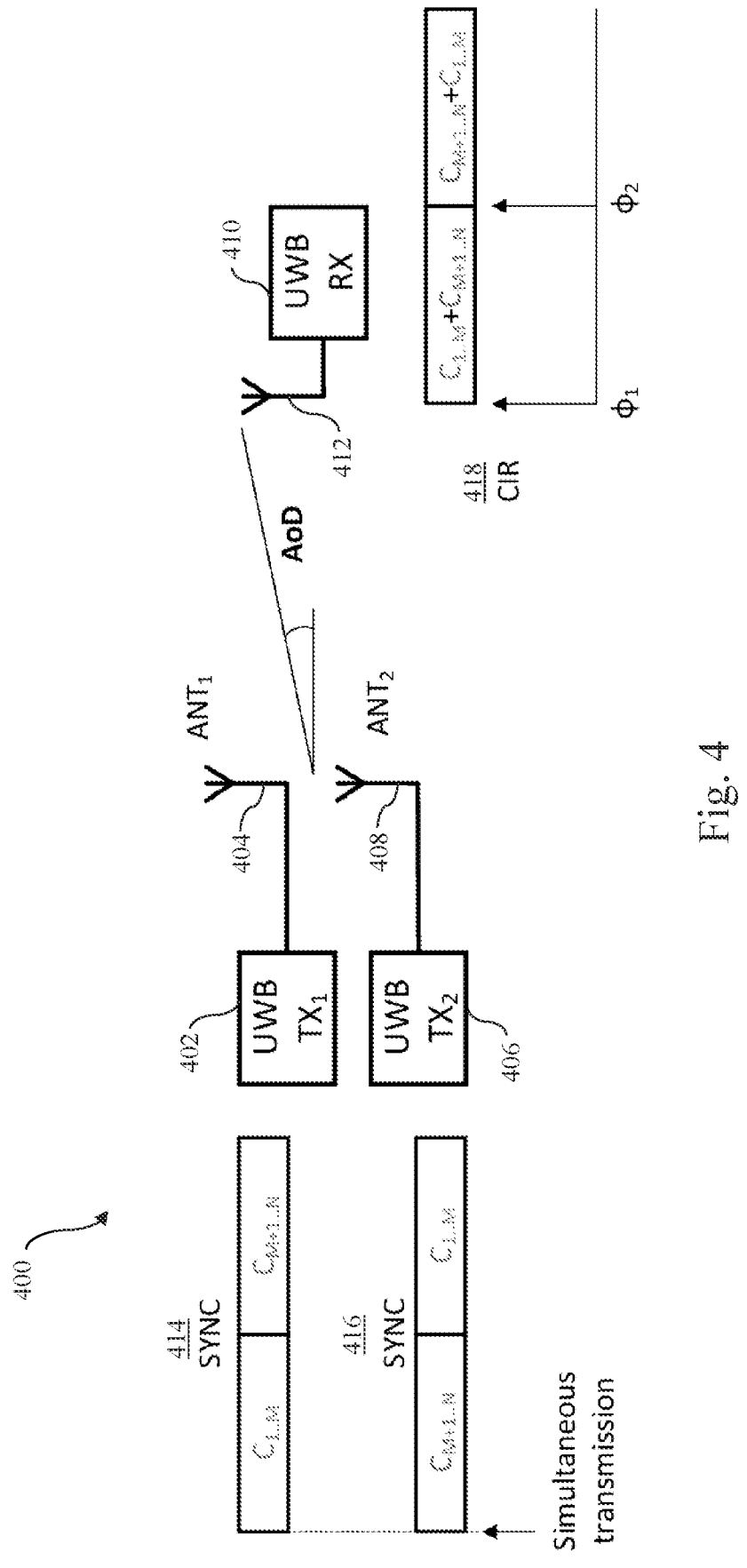
FIG. 4 shows an illustrative embodiment of a localization system.

FIG. 4 shows an illustrative embodiment of a localization system 400. The localization system 400 comprises a communication system of the kind set forth above, including UWB transmitters 402, 406. Furthermore, the localization system 400 comprises transmitter antennas 404, 408, each of which is coupled to one of said UWB transmitters 402, 406. In addition, the localization system 400 comprises a communication device of the kind set forth above, including a UWB receiver 410. Furthermore, the localization system 400 comprises a receiver antenna 412 coupled to the UWB receiver 410. In operation, the UWB transmitters 402, 406 transmit SYNC packets 414, 416 to the UWB receiver 410. In particular, a first one 402 of said UWB transmitters sends a SYNC packet 414 including a predefined code $C_{1 \ldots N}$ to the UWB receiver 410, and a second one 406 of said UWB transmitters sends a SYNC packet 416 including a cyclically shifted version of said predefined code. Furthermore, a processing unit (not shown) within the communication device correlates the SYNC packets 414, 416 received by the UWB receiver 410 with the predefined code. In addition, the processing unit may generate a CIR 418 based on the correlation result.

In particular, the predefined code $C_{1 \ldots N}$ may be a code with ideal circular autocorrelation properties, for example a ternary code. The code $C_{1 \ldots N}$ may be split at the M-th bit, resulting in two code sets, $C_{1 \ldots M}$ and $C_{M+1 \ldots N}$. Then, the first SYNC packet 414 may be generated using the original code $C=[C_{1 \ldots M}C_{M+1 \ldots N}]$, and the second SYNC packet 416 may be generated using the cyclically shifted code $[C_{M+1 \ldots N}C_{1 \ldots M}]$. Subsequently, the first SYNC packet 414 may be transmitted through the first UWB transmitter 402, and simultaneously the second SYNC packet 416 may be transmitted through the second UWB transmitter 406. Next, the overlapping SYNC packets 414, 416 may be received by the UWB receiver 410, and the processing unit may generate a complex-valued CIR 418 based on correlating the received overlapping SYNC packets 414, 416 with the predefined code $C_{1 \ldots N}$. The skilled person will appreciate that this CIR 418 will have two peaks corresponding to the channels between the UWB receiver 410 and the two UWB transmitters 402, 406. Finally, the AoD or AoA may be computed from phase values associated with the CIR 418. In a practical implementation, the predefined code $C_{1 \ldots N}$ may correspond to a one symbol comprised in a SYNC packet. In practice, a SYNC packet typically contains multiple symbols (e.g., 64), each one of which may correspond to a predefined code of the kind set forth. Thus, in a practical implementation, the data packet is a SYNC packet, and the predefined code corresponds to a symbol included in said SYNC packet.

Figure 5:
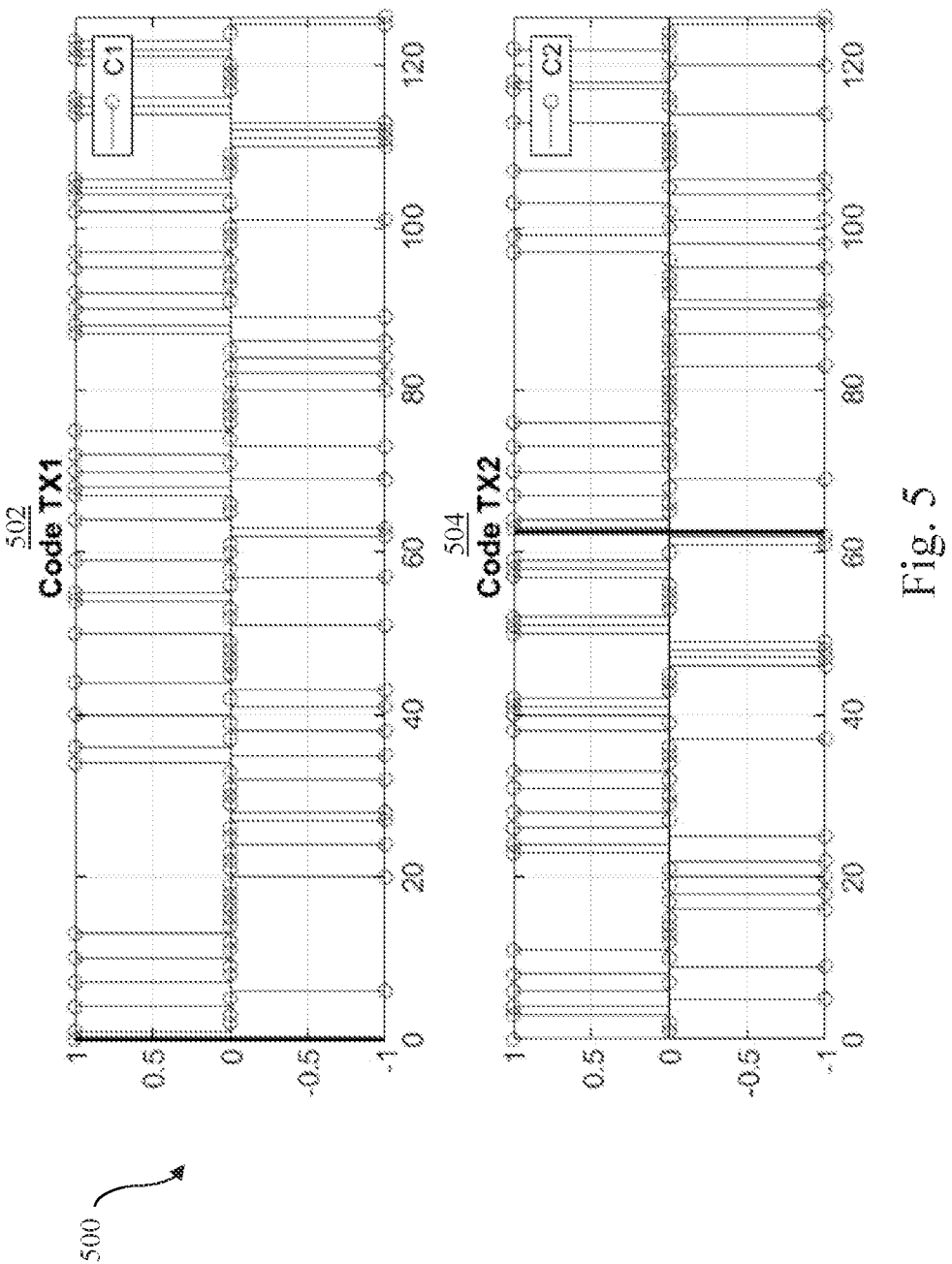
FIG. 5 shows different codes transmitted by a communication system.

FIG. 5 shows different codes 500 transmitted by a communication system of the kind set forth above. In particular, an example is shown in which a first code 502, i.e., a ternary code C1 having a length of 127 bits, is used for a SYNC packet transmitted through the first UWB transmitter 402. Furthermore, a second code 504, i.e., code C2, is obtained from the first code 502 by a cyclic shift of 63 bits. The second code 504 is used for a SYNC packet transmitted through the second UWB transmitter 406.

Figure 6:
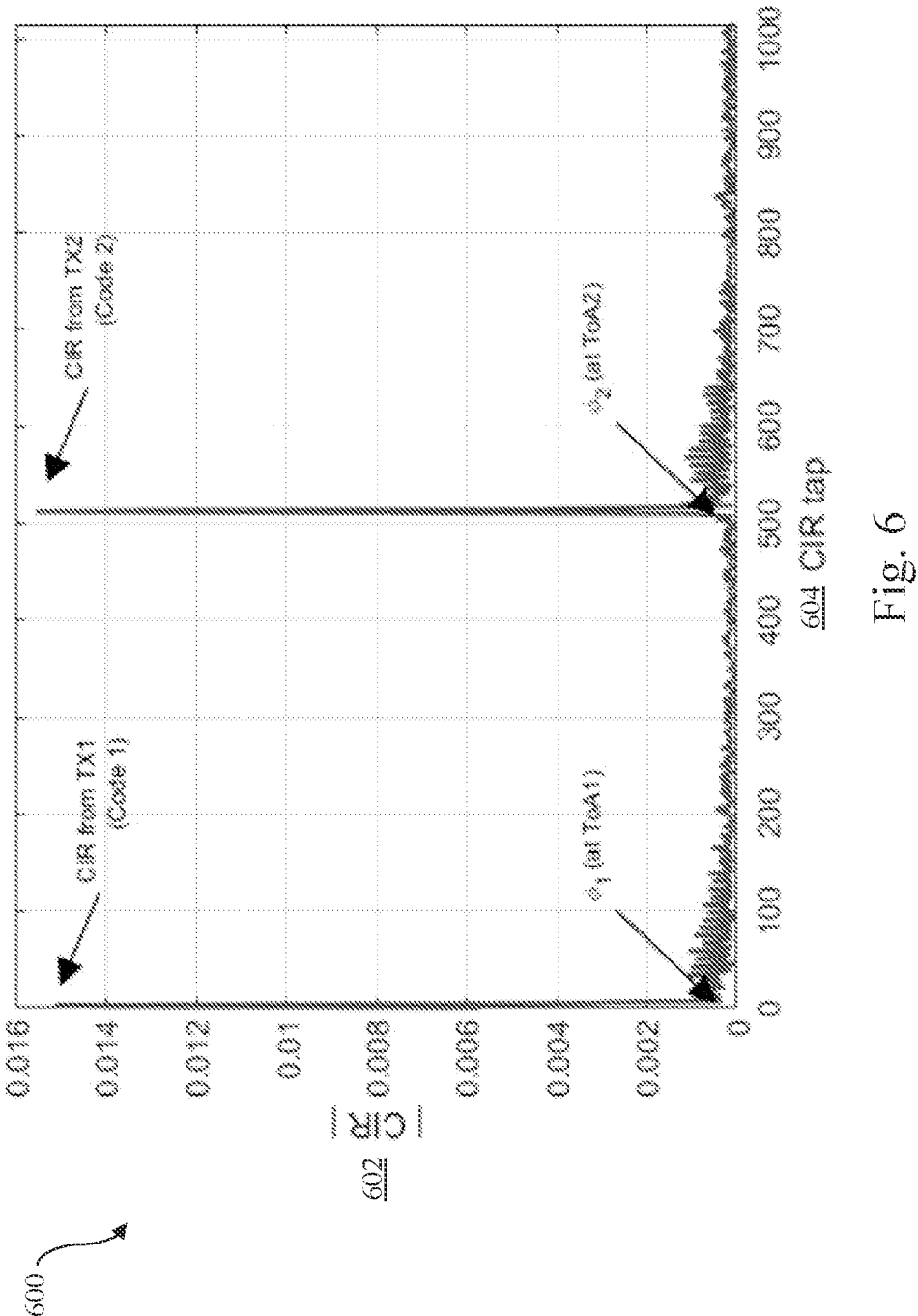
FIG. 6 a simulated channel impulse response and associated phase values.

FIG. 6 shows a simulated channel impulse response and associated phase values 600. In particular, the reception of a simultaneous transmission of two SYNC packets of the kind set forth above results in a CIR 602 having two peaks, corresponding to the channels to the first UWB transmitter 402 and the second UWB transmitter 406, respectively. The phase values φ1 and φ2 are obtained from the complex-valued CIR tap value at, for example, the time of arrival (ToA) of each packet or the maximum of each peak. It is noted that one CIR tap 604 equals 1 ns. Finally, the AoD or AoA may be computed using the phase values φ1 and φ2.

Figure 7:
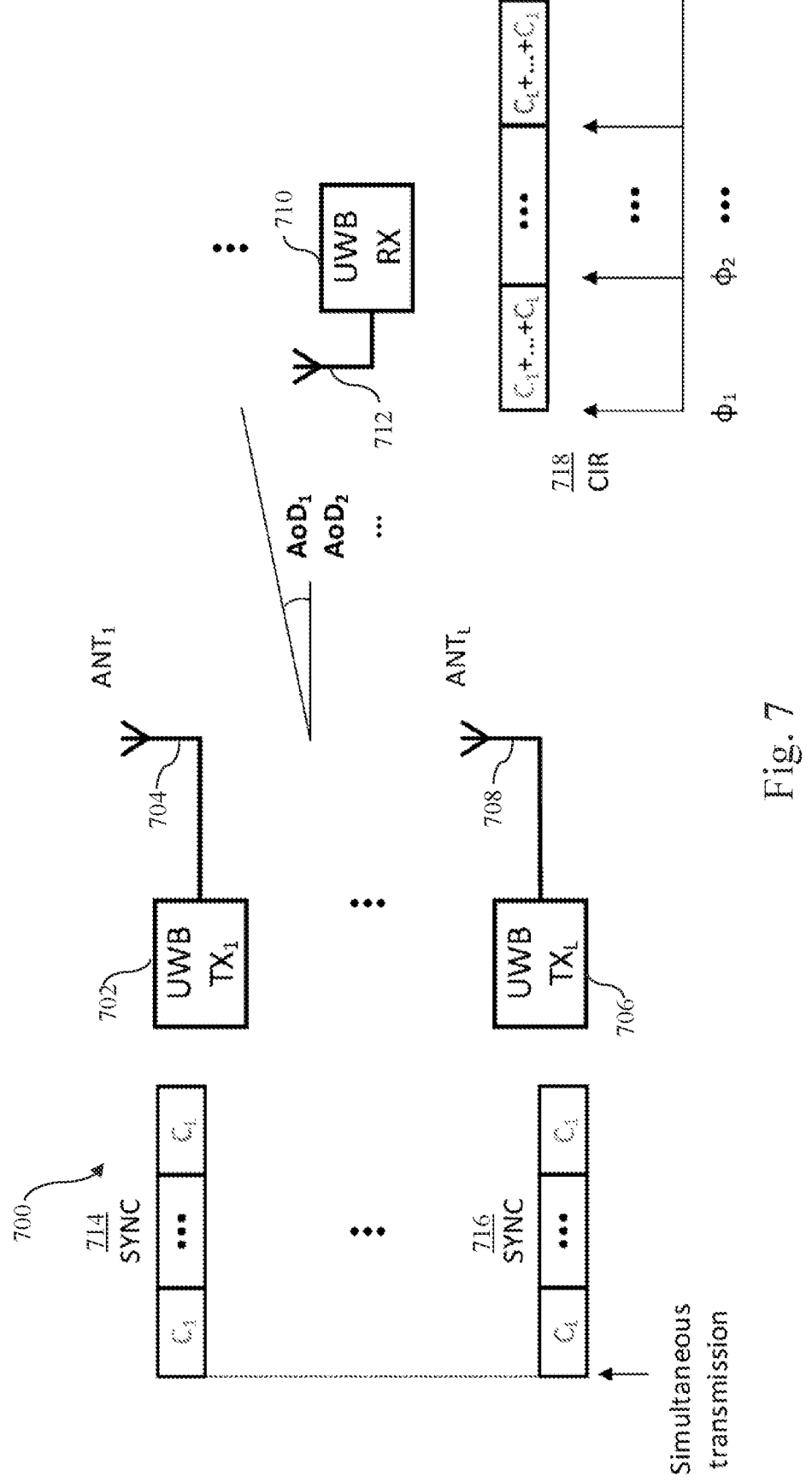
FIG. 7 shows an illustrative embodiment of a multiple-input multiple-output (MIMO) system.

FIG. 7 shows an illustrative embodiment of a multiple-input multiple-output (MIMO) system 700. In particular, it is shown how the presently disclosed communication system may be extended to include more than two UWB transmitters. More specifically, the MIMO system 700 includes a set of L transmitters, i.e., UWB transmitter 702 to UWB transmitter 706, each of which is coupled to an antenna 704, 708. Furthermore, the MIMO system 700 includes at least one UWB receiver 710 coupled to an antenna 712. In operation, a predefined code C with ideal circular autocorrelation properties is split into L subcodes C1 to CL, and cyclically shifted versions of it are assigned to SYNC packets 714, 716 which, again, may be transmitted simultaneously via the L transmitters. It is noted that the subcodes may have the same lengths or varying lengths. Then, the UWB receiver 710 may receive the overlapping SYNC packets 714, 716. It is noted that the time of flight (ToF) over the different paths is in general significantly smaller than the packet length. The skilled person will appreciate that the resulting CIR will comprise L peaks, each peak corresponding to one of the L UWB transmitters 702, 706 and occurring at the intersection of the subcodes. It is noted the ideal autocorrelation property of the code C may ensure that the resulting CIR will comprise said L peaks. Finally, the processing unit may compute phase values associated with the peaks and is therefore able to determine the AoD or AoA between any two transmitters (e.g., it can determine a 3D AoA using azimuth and elevation).

It is noted that two or more of the multiple UWB transmitters 702, 706 may be integrated on the same UWB chip. Furthermore, to facilitate the simultaneous transmission of the SYNC packets 714, 716, the UWB transmitters 702, 706 may be synchronized before the SYNC packets 714, 716 are transmitted. The skilled person will appreciate that this synchronization may be carried out in various ways. For example, a reference clock signal and a synchronization signal may be shared among the UWB transmitters 702, 706, or the UWB transmitters 702, 706 may be synchronized wirelessly using a UWB ranging frame before the AoD or AoA operation is performed.

The presently disclosed communication system, communication device, methods of operation and computer programs may be used to advantage in various types of localization systems, for example in industrial internet of things (IIoT) applications. In such applications, a tag may need to be located and tracked by a system including multiple anchors. In that case, the tag may be an implementation of the presently disclosed communication device, and the system including multiple anchors may be an implementation of the presently disclosed communication system. Given the cost constraints, the tag may only have one antenna. Thus, the tag may not be able to determine the AoA based on multiple antennas. The multiple anchors may implement the multiple UWB transmitters, which transmit SYNC packets to the tag, such that the tag may determine the AoD as well as the equivalent thereof (i.e., the AoA). In that case, the airtime should be reduced to avoid interference with other UWB systems. Since the presently disclosed system and device facilitate transmitting the SYNC packets in an overlapping manner, the airtime may be reduced, as well as the need for complex scheduling procedures.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 localization system
102 UWB transmitter
104 antenna
106 UWB transmitter
108 antenna
110 UWB receiver
112 antenna
114 SYNC packet
116 transmission schemes
118 first transmission scheme
120 second transmission scheme
200 communication system
202 UWB transmitter 204 UWB transmitter
206 controller
208 method of operating a communication system
210 causing, by a controller, a first UWB transmitter to transmit a first packet to an external communication device, wherein the first packet contains a predefined code
212 causing, by said controller, a second UWB transmitter to transmit a second packet to the external communication device, wherein the second packet contains a cyclically shifted version of said predefined code
300 communication device
302 UWB receiver
304 processing unit
306 method of operating a communication device
308 receiving, by a UWB receiver included in a communication device, at least a first packet and a second packet from an external communication system, wherein the first packet contains a predefined code, and the second packet contains a cyclically shifted version of said predefined code
310 correlating, by a processing unit included in the communication device, the first packet and the second packet with the predefined code
400 localization system
402 UWB transmitter
404 antenna
406 UWB transmitter
408 antenna
410 UWB receiver
412 antenna
414 SYNC packet
416 SYNC packet
418 channel impulse response
500 transmitted codes
502 first transmitted code
504 second transmitted code
600 simulated channel impulse response and associated phase values
602 channel impulse response
604 channel impulse response tap
700 multiple-input multiple-output (MIMO) system
702 UWB transmitter
704 antenna
706 UWB transmitter
708 antenna
710 UWB receiver
712 antenna
714 SYNC packet
716 SYNC packet
718 channel impulse response

The invention claimed is:

1. A communication system, comprising:
a first ultra-wideband, UWB, transmitter configured to be coupled to a first antenna;
a second UWB transmitter configured to be coupled to a second antenna;
a controller configured to cause the first UWB transmitter to transmit a first packet to an external communication device, wherein the first packet contains a predefined code;
wherein the controller is further configured to cause the second UWB transmitter to transmit a second packet to the external communication device, wherein the second packet contains a cyclically shifted version of said predefined code.

2. The communication system of claim 1, wherein the controller is further configured to cause the first UWB transmitter and the second UWB transmitter to transmit the first packet, respectively the second packet, simultaneously or substantially simultaneously to the external communication device.

3. The communication system of claim 2, wherein the predefined code is a code having ideal circular autocorrelation properties, in particular a ternary code.

4. The communication system of claim 2, wherein the controller is further configured to synchronize the first UWB transmitter and the second UWB transmitter before the first UWB transmitter transmits the first packet and the second UWB transmitter transmits the second packet.

5. The communication system of claim 2, further comprising at least one third UWB transmitter configured to be coupled to a third antenna, wherein the controller is further configured to cause the third UWB transmitter to transmit a third packet to the external communication device, wherein the third packet contains another cyclically shifted version of the predefined code.

6. The communication system of claim 2, forming part of an initiator in a localization system.

7. The communication system of claim 1, wherein the predefined code is a code having ideal circular autocorrelation properties, in particular a ternary code.

8. The communication system of claim 1, wherein the controller is further configured to synchronize the first UWB transmitter and the second UWB transmitter before the first UWB transmitter transmits the first packet and the second UWB transmitter transmits the second packet.

9. The communication system of claim 1, further comprising at least one third UWB transmitter configured to be coupled to a third antenna, wherein the controller is further configured to cause the third UWB transmitter to transmit a third packet to the external communication device, wherein the third packet contains another cyclically shifted version of the predefined code.

10. The communication system of claim 1, forming part of an initiator in a localization system.

11. A method of operating a communication system, comprising:
causing, by a controller, a first ultra-wideband, UWB, transmitter to transmit a first packet to an external communication device, wherein the first packet contains a predefined code;
causing, by said controller, a second UWB transmitter to transmit a second packet to the external communication device, wherein the second packet contains a cyclically shifted version of said predefined code.

12. A communication device, comprising:
an ultra-wideband, UWB, receiver configured to be coupled to an antenna, wherein the UWB receiver is further configured to receive at least a first packet and a second packet from an external communication system, wherein the first packet contains a predefined code and the second packet contains a cyclically shifted version of said predefined code;
a processing unit configured to correlate the first packet and the second packet received by the UWB receiver with the predefined code.

13. The communication device of claim 12, wherein the UWB receiver is configured to receive the first packet and the second packet simultaneously or substantially simultaneously.

14. The communication device of claim 13, wherein the processing unit is further configured to generate a channel impulse response, CIR, based on a result of correlating the first packet and the second packet with the predefined code.

15. The communication device of claim 13 being a responder in a localization system.

16. The communication device of claim 12, wherein the processing unit is further configured to generate a channel impulse response, CIR, based on a result of correlating the first packet and the second packet with the predefined code.

17. The communication device of claim 16, wherein the processing unit is further configured to compute phase values associated with peaks included in the CIR, and to compute an angle of departure of the first packet and the second packet based on said phase values.

18. The communication device of claim 12, being a responder in a localization system.

19. A method of operating a communication device, comprising:

receiving, by an ultra-wideband, UWB, receiver included in the communication device, at least a first packet and a second packet from an external communication system, wherein the first packet contains a predefined code, and the second packet contains a cyclically shifted version of said predefined code;

correlating, by a processing unit included in the communication device, the first packet and the second packet with the predefined code.

\* \* \* \* \*